(12) United States Patent
Kaulgud et al.

(10) Patent No.: US 7,140,024 B2
(45) Date of Patent: *Nov. 21, 2006

(54) SYSTEM AND METHOD FOR MANAGING GRAPHICS APPLICATIONS

(75) Inventors: Alpana R. Kaulgud, Mountain View, CA (US); William J. Feth, San Jose, CA (US); Christophe Winkler, Viterne (FR)

(73) Assignee: Silicon Graphics, Inc., Mountain View, CA (US)

( * ) Notice: Subject to any disclaimer, the term of this patent is extended or adjusted under 35 U.S.C. 154(b) by 735 days.

This patent is subject to a terminal disclaimer.

(21) Appl. No.: 10/208,123

(22) Filed: Jul. 29, 2002

(65) Prior Publication Data

US 2005/0166214 A1    Jul. 28, 2005

(51) Int. Cl.
  *G06F 15/163* (2006.01)
(52) U.S. Cl. ............. 719/310; 345/1.1; 345/1.3; 345/506
(58) Field of Classification Search ......... 719/310, 719/311; 345/1.1, 1.3, 501, 506
See application file for complete search history.

(56) References Cited

U.S. PATENT DOCUMENTS

| 5,511,193 A | 4/1996 | Tung et al. |
| 5,530,865 A | 6/1996 | Owens et al. |
| 5,831,607 A | 11/1998 | Brooks |
| 6,091,430 A | 7/2000 | Bodin et al. |
| 6,111,582 A | 8/2000 | Jenkins |
| 6,119,147 A | 9/2000 | Toomey et al. |
| 6,151,020 A | 11/2000 | Palmer et al. |
| 6,173,315 B1 | 1/2001 | Deleeuw |
| 6,229,542 B1 | 5/2001 | Miller |
| 6,329,984 B1 | 12/2001 | Boss et al. |
| 6,330,685 B1 | 12/2001 | Hao et al. |
| 6,400,380 B1 | 6/2002 | Ansberry et al. |
| 6,489,980 B1 | 12/2002 | Scott et al. |
| 6,509,898 B1 | 1/2003 | Chi et al. |
| 6,563,498 B1 | 5/2003 | Hirata et al. |
| 6,594,664 B1 | 7/2003 | Estrada et al. |
| 6,642,918 B1 | 11/2003 | Uchida et al. |
| 6,864,894 B1 * | 3/2005 | Lefebvre et al. ............ 345/506 |
| 6,909,432 B1 * | 6/2005 | Alcorn et al. ............... 345/506 |
| 2003/0158886 A1 * | 8/2003 | Walls et al. ................. 709/201 |

OTHER PUBLICATIONS

"System and Method for Managing Graphics Applications", Specification, Claims and Abstract (49 pages), 6 pages of drawings, inventors Alpana R. Kaulgud, et al, filed Jul. 29, 2002.

"System and Method for Managing Graphics Applications", Specification, Claims and Abstract (63 pages), 9 pages of drawings, inventors Alpana R. Kaulgud, et al, filed Jul. 29, 2002.

* cited by examiner

Primary Examiner—William Thomson
Assistant Examiner—Andy Ho
(74) Attorney, Agent, or Firm—Baker Botts L.L.P.

(57) ABSTRACT

A system and method for managing graphics applications include the capability to manage the conveyance of graphics data from an aware graphics application to a plurality of graphics pipes and to manage the conveyance of graphics data from an unaware graphics application to a plurality of graphics pipes. The system and method also include the capability to coherently manage the windows for aware and unaware applications.

19 Claims, 6 Drawing Sheets

SYSTEM AND METHOD FOR MANAGING GRAPHICS APPLICATIONS

TECHNICAL FIELD OF THE INVENTION

The present invention relates to computer graphics and more particularly to a system and method for managing graphics applications.

BACKGROUND OF THE INVENTION

Multi-monitor display systems have seen an increasing growth in popularity over the past several years. These display systems are advantageous because, relative to a standard monitor, they provide more screen real estate. Accordingly, graphics applications have been created that are able to understand this environment and create graphics for display on monitors fed by multiple graphics pipes, that is, a multi-monitor display system that is driven by more than one graphics pipe.

Unfortunately, there are a large number of graphics applications that are only capable of interacting with one graphics pipe. Thus, these applications are not able to take full advantage of the multi-monitor display systems driven by multiple graphics pipes. Furthermore, window managers are not capable of concurrently interacting with graphics applications that are unaware of the multi-monitor environment and applications that are aware of the multi-monitor environment.

SUMMARY OF THE INVENTION

From the foregoing, it may be appreciated by those skilled in the art that a need has arisen for a technique to provide windows management support for applications that are unaware of the multi-monitor environment running concurrently with applications that are aware of the multi-monitor environment. According to the present invention, a system and method for managing graphics applications are provided that substantially eliminate or greatly reduce disadvantages and problems associated with conventional graphics applications.

In certain embodiments, a system for managing graphics applications includes a first application manager and a second application manager. The first application manager is operable to manage the conveyance of graphics data from an aware graphics application to a plurality of graphics pipes. The second application manager is operable to manage the conveyance of graphics data from an unaware graphics application to a plurality of graphics pipes. Furthermore, the first application manager and the second application manager may operate concurrently with coherent window management support for aware and unaware graphics applications.

In some embodiments, a method for managing graphics applications includes managing the conveyance of graphics data from an aware graphics application to a plurality of graphics pipes and managing the conveyance of graphics data from an unaware graphics application to the graphics pipes. The method also includes coherently managing the windows for aware and unaware applications.

The present invention has a variety of technical features. For example, in some embodiments, a graphics server may manage an application that is unaware of the multiple monitor environment to allow it to use the monitors as a single large display, which expands the usefulness of multi-monitor displays. One aspect of this management may, for example, include the ability to homogenize the capabilities of heterogeneous graphics pipes, which allows the graphics data from the unaware application to be displayed in the same manner on each monitor. As another example, in certain embodiments, a graphics server may manage graphics applications that are aware of the multiple monitor environment and graphics applications that are unaware of the multiple monitor environment, which again expands the usefulness of multi-monitor displays. Furthermore, a graphics server may concurrently manage applications that are aware and unaware of the multiple monitor environment, which again expands the usefulness of multi-monitor displays. Moreover, aware applications may be run with unaware applications while imposing little overhead on the aware applications. As an additional example, in some embodiments, coherent window management is provided for unaware and aware graphics applications, which again expands the usefulness of multi-monitor displays. As another example, in certain embodiments, unaware applications may query and manipulate the resources of aware applications, and aware applications may query and manipulate the resources of unaware applications. Hence, an application manager may be determined by the type of resource being manipulated rather than the type of application that is manipulating it.

Of course, some embodiments may possess none, one, some, or all of the technical features and/or additional technical features. Other technical features may be readily apparent to those skilled in the art from the following figures, description, and claims.

BRIEF DESCRIPTION OF THE DRAWINGS

The drawings described below provide a more complete understanding of the present invention and its technical features, especially when considered in light of the following detailed written description, wherein like reference numbers represent like parts, in which:

FIG. 6 illustrates a table of capability sets for graphics pipes; and

DETAILED DESCRIPTION OF THE INVENTION

Figure 1:
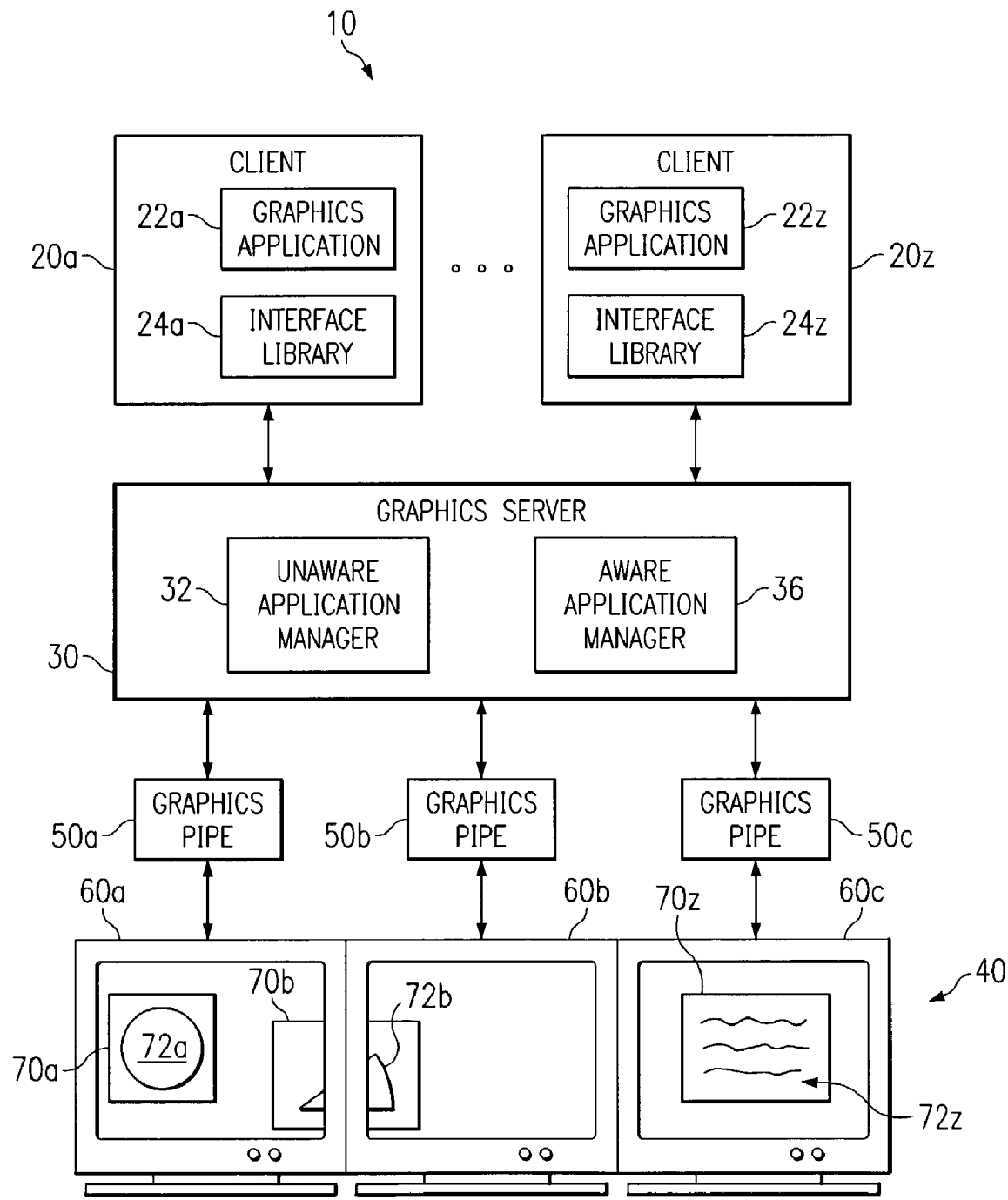
FIG. 1 illustrates one embodiment of a system for managing graphics applications.

FIG. 1 illustrates one embodiment of a system 10 for managing graphics applications. In general, system 10 includes clients 20, a graphics server 30, and a display system 40, which includes graphics pipes 50 and monitors 60 in this embodiment. Clients 20 generate graphics data, such as for example geometric primitives, that need to be displayed. Graphics server 30 is responsible for managing the conveyance of the graphics data from clients 20 to display system 40. Graphics pipes 50 of display system 40, in turn, are responsible for converting the graphics data into signals that drive monitors 60, which display the graphics data according to the signals.

As illustrated, monitors 60 of display system 40 are displaying windows 70, each of which contains a graphic 72. For example, window 70a contains graphic 72a, which is a circle in this illustration. As another example, window 70z contains graphic 72z, which is text in this illustration. For its part, window 70b is split between monitors 60a and 60b. Accordingly, part of window 70b is being displayed by monitor 60a and part of window 70b is being displayed by monitor 60b. Graphics server 30 may facilitate this by conveying part of the graphics data for window 70b to graphics pipe 50a and the other part of the graphics data for window 70b to graphics pipe 50b, by conveying all of the graphics data for window 70b to both of graphics pipes 50a–b, along with instructions on how to clip the graphics data, or by any other appropriate technique. Accordingly, in this embodiment, monitors 60 may be used as a single large display.

In general, monitors 60 may be used as individual display devices, as a single display device, or as a combination of a multiple monitor display device and individual display devices. Furthermore, a configuration file may be used to specify the arrangement and/or operations of monitors 60, which may have a regular or non-regular shape. Note that for objects displayed on more than one monitor, there may be an overlap of the object on both monitors, a gap between the object on both monitors, or a direct representation on both monitors. Also note that clients 20 may or may not be aware of the number of graphics pipes 50 and, hence, the distribution of graphics data between graphics pipes 50 and/or monitors 60.

In more detail, each of clients 20 includes a graphics application 22 and an interface library 24. Graphics applications 22 may be any appropriate type of computer software that generates graphics data, such as for example text, objects, pictures, and/or video. Moreover, the graphics data may be two-dimensional (2D) or three-dimensional (3D). Examples of such graphics applications include Netscape™, Origami, and Performer™. As noted previously, graphics applications 22 may be aware or unaware of the number of graphics pipes 50 and/or monitors 60. An example of an unaware application is Netscape™, and an example of an aware application is Performer™. Interface libraries 24 are responsible for receiving graphics information calls—graphics data, initialization data, commands, or any other appropriate graphics related function—from graphics applications 22 and converting them into an appropriate format for graphics server 30. In particular embodiments, interface libraries 24 are X-libraries, although any other appropriate type of library may be used. Interface libraries 24 may be different libraries or different instances of the same library. In particular embodiments, however, one or more of graphics applications 22 may not require an interface library.

Graphics server 30 includes an unaware application manager 32 and an aware application manager 36. Unaware application manager 32 is, in general, responsible for managing the conveyance of graphics data from clients 20 that are not capable of appreciating the number of graphics pipes 50, this ability determined by the type of graphics application 22 of each client 20. Such applications are typically only be able to interact with one of graphics pipes 50, although some may be able to interact with just a fewer number of graphics pipes than are being used in the system. To accomplish this, unaware application manager 32 aggregates the characteristics of two or more of graphics pipes 50 and presents them to these clients as a consolidated unit. Furthermore, unaware application manager 32 is responsible for conveying the graphics data from these clients to the appropriate graphics pipes 50. Conveying the data may include dividing the data appropriately between the graphics pipes, copying the data between the graphics pipes, or any other appropriate technique. Accordingly, unaware graphics applications may view graphics pipes 50 as being fewer in number than there actually are. In contrast, aware application manager 36 is, in general, responsible for managing the conveyance of graphics data from clients that are capable of appreciating the number of graphics pipes 50. To accomplish this, aware application manager 36 presents the characteristics of each of graphics pipes 50 to these clients and conveys the graphics data from these applications to the appropriate graphics pipes 50. Conveying the data may include distributing the data appropriately between the graphics pipes, copying the data between the graphics pipes, or any other appropriate technique. Unaware application manager 32 and aware application manager 36 may send the graphics data through graphics pipes 50 by multicast, broadcast, direct messaging, or any other appropriate technique.

In particular embodiments, unaware application manager 32 and aware application manager 36 perform their duties by using respective dispatch tables. Dispatch tables may include a variety of functions that are able to respond to calls from clients 20, such as for example establishing a connection with clients 20, creating a window on monitors 60 for clients 20, and drawing graphics data, such as for example lines, arcs, and rectangles, for clients 20. Some of the functions performed in response to the calls may be carried out by different parts of graphics server 30. In particular embodiments, the dispatch tables know which function to execute based on identifiers included by interface libraries 24 with the graphics information.

In certain embodiments, the dispatch table for unaware application manager 32 may accomplish its function by determining the division of graphics data between graphics pipes 50 and then accessing functions in the dispatch table for aware application manager 36 for each of graphics pipes 50, substituting per-pipe resources as required. For example, if an unaware application issues a resource creation request, the dispatch table for unaware application manager 32 actually creates a resource for each graphics pipe 50 by calling the dispatch table in application manager 36 once for each graphics pipe. The application will only know about one of the created resources. For later resource requests, the dispatch table looks up the related per pipe resources and substitutes them as required when it calls the other dispatch table for each graphics pipe 50.

As mentioned previously, unaware application manager 32 and aware application manager 36 are responsible for conveying graphics data from graphics applications 22 to the appropriate graphics pipes 50. Accordingly, if one of graphics applications 22 wants to draw an object on monitor 60a, unaware application manager 32 or aware application manager 36 may convert the graphics data into an appropriate format for graphics pipe 50a and send the formatted data to the graphics pipe. In particular embodiments, graphics server 30 may use X-server technology for managing 2D graphics data and OpenGL technology for managing 3D graphics data.

Graphics server 30 may be implemented on any type of computer. In certain embodiments, graphics server 30 is implemented on an Onyx™ server from Silicon Graphics. Furthermore, in particular embodiments, graphics server 30 may include an X-server from Silicon Graphics with Xorg's Xinerama extension. Graphics server 30 may include logical instructions encoded in random access memory, in a field programmable gate array, in a compact disk, or in any other type of volatile or non-volatile electromagnetic or optical information storage media.

As mentioned previously, display system 40 includes graphics pipes 50 and monitors 60. In general, graphics pipes 50 are responsible for converting the graphics data into signals that drive monitors 60. As illustrated, each of graphics pipes 50 drives one of monitors 60. Graphics pipes 50 may be video adapters, graphics accelerators, and/or any other type of device for converting graphics data into signals that drive one or more of monitors 60. In particular embodiments, each of graphics pipes 50 may have an associated display driver, which is typically a piece of software residing between the graphics pipe and the graphics server/graphics library, to abstract the quirks of a particular graphics pipe so that a common interface may be presented to the graphics server/graphics library for drawing. Furthermore, in certain embodiments, each of graphics pipes 50 may include a framebuffer, which is a component into which the graphics application draws and out of which the monitor reads. The size of the framebuffer may correspond to the number of pixels and the capability sets available to display the pixels for the particular graphics pipe. Monitors 60 receive the signals from graphics pipes 50 and generate illumination detectable by the human eye based on the signals. Monitors 60 may be cathode-ray tube (CRT) displays, liquid crystal displays (LCDs), and/or any other type of device for generating visual information. Moreover, in certain embodiment intervening devices may be placed between monitors 60 and graphics pipes 50.

In operation, when one of graphics applications 22 wants to have graphics data displayed, it establishes a connection to graphics server 30. To accomplish this, the graphics application calls the appropriate function in the associated interface library 24, which generates an appropriate connection request to graphics server 30. The connection request also includes an indication of whether the application wants to be aware or unaware of the number of graphics pipes 50. Interface library 24 may determine this, for example, by examining a run-time environment variable. When the connection request arrives at graphics server 30, graphics server 30 determines whether the connection request is for a client that wants to be aware of each of graphics pipes 50 or unaware of each of graphics pipes 50. If graphics server 30 determines that the client does not want to be aware of graphics pipes 50, graphics server 30 assigns the connection request to unaware application manager 32, the application manager typically remaining assigned to the connection until the connection closes. If, however, graphics server 30 determines that the connection request is from a client that wants to be aware of graphics pipes 50, the graphics server assigns the connection request to aware application manager 36. The assigned application manager will then generate a connection reply containing the appropriate information regarding graphics pipes 50 for the requesting graphics application.

When unaware application manager 32 receives a connection request, unaware application manager 32 determines the characteristics of graphics pipes 50 and aggregates them for the requesting client 20. For example, unaware application manager 32 may determine that the resolution of each display area is 640×480. Accordingly, unaware application manager 32 may report that the resolution of the display area is 1920×480. The requesting client 20, therefore, would think that there is one large display area when, in fact, there are three smaller display areas.

In contrast, when aware application manager 36 receives a connection request, it determines the underlying characteristics of graphics pipes 50 and reports them back individually to the requesting graphics application. For example, if the resolution of each display area is 640×480, the requesting client would learn that there are three 640×480 display areas.

Once the requesting client 20 has determined the capabilities of display system 40, the graphics application of the client may initiate the creation of a window for displaying graphics data. To accomplish this, the graphics application may make an appropriate call to the associated interface library 24, which generates an appropriate window creation request for graphics server 30. When the window request is received by graphics server 30, the window request is associated with the appropriate one of unaware application manager 32 or aware application manager 36 based on the assignment of the connection request. The appropriate application manager may then create the window for the client and notify the client that the window is available.

The graphics application of the client may then begin sending graphics data to the graphics server 30. To accomplish this, the graphics application calls the associated interface library 24, which generates an appropriate graphics data request for graphics server 30. When the graphics data is received by graphics server 30, it, as with the connection request and the create window request, is processed by the appropriate application manager, and is conveyed to the appropriate graphics pipes 50. As discussed previously, unaware application manager 32 may divide the graphics data from a client between graphics pipes 50, and, in contrast, aware application manager 36 may distribute the graphics data from a client to the appropriate ones of graphics pipes 50.

Note that an application capable of being aware of graphics pipes 50 may access graphics server 30 through an unaware connection, making it unaware of graphics pipes 50. Graphics server 30 may manage such a client as an unaware application. Also note that a client accessing graphics server 30 through an unaware connection may still access aspects of graphics server 30 that are normally hidden from unaware applications. In particular embodiments, components of client 20 may make explicit calls to the application manager.

This embodiment of the present invention has a variety of technical features. For example, a graphics server may manage an unaware graphics application by allowing it to use multiple monitors as a single large display, resulting in a larger framebuffer size. Moreover, the graphics of such an application may be dragged across or overlap graphics pipe boundaries. As another example, a graphics server may manage unaware and aware graphics applications. Accordingly, multi-monitor displays may be readily used with both types of graphics applications, which expands the usefulness of multi-monitor display systems. Moreover, the graphics server may simultaneously manage unaware and multiple applications. Accordingly, these graphics applications may be used in conjunction with each other, which again expands the usefulness of multi-monitor systems. A variety of other technical features exist.

In particular embodiments, aware applications may be run with unaware graphics applications while imposing little overhead on the aware graphics applications. This allows the latter to function normally even though both type of applications are being managed.

In certain embodiments, a graphics application may open any number of aware and unaware connections, such as for example an unaware connection for a graphical user interface (GUI) and an aware connection for graphics. This allows different contexts of the application to have access to the multi-monitor display system, if desired.

In some embodiments, unaware applications may query and manipulate the resources of aware applications and/or aware applications may query and manipulate the resources of unaware applications, which allows these applications to interact with each other. To accomplish this, when unaware application manager 32 receives an aware resource request, it, perhaps after failing when trying to look up the real window identifier mapping, calls aware application manager 36 to handle the request instead. A similar approach may be taken for the case in which aware application manager 36 tries to handle an unaware resource request. Thus, the application manager for the request is chosen based on the type of resource being manipulated rather than based on whether the client making the request is aware or unaware. Such functionality may also be useful if an unaware graphics application accidentally obtains an aware window identifier or an aware graphics application accidentally obtains an unaware window identifier.

Although system 10 illustrates one embodiment of a system for managing graphics applications, other embodiments may have less, more, and/or a different arrangement of components. For example, in some embodiments, unaware application manager 32 may be part of aware application manager 36. As another example, in certain embodiments, parts of unaware application manager 32 and/or aware application manager may be external to graphics server 30. As a further example, in particular embodiments, one or more of graphics pipes 50 may drive more than one of monitors 60. As another example, in certain embodiments, more than one of graphics pipes 50 may drive one of monitors 60, possibly through the use of an intervening compositor. As an additional example, in some embodiments, display system 40 may use projectors and screens instead of monitors 60. In general, therefore, display system 40 may use any type of devices for generating visual information from graphics data. As another example, in particular embodiments, one or more of clients 20 may be coupled to more than one graphics server without their knowledge, through the use of proxy libraries associated with the client and the graphics server. The proxy libraries allow the connection requests, window creation requests, and graphics data to be conveyed correctly to each of the graphics servers and/or associated graphics pipes while aggregating the responses from the graphics servers and/or graphics pipes. Accordingly, the proxies allow the graphics applications to think it is interacting with fewer graphics pipes than there actually are. A variety of other examples exist.

Figure 2:
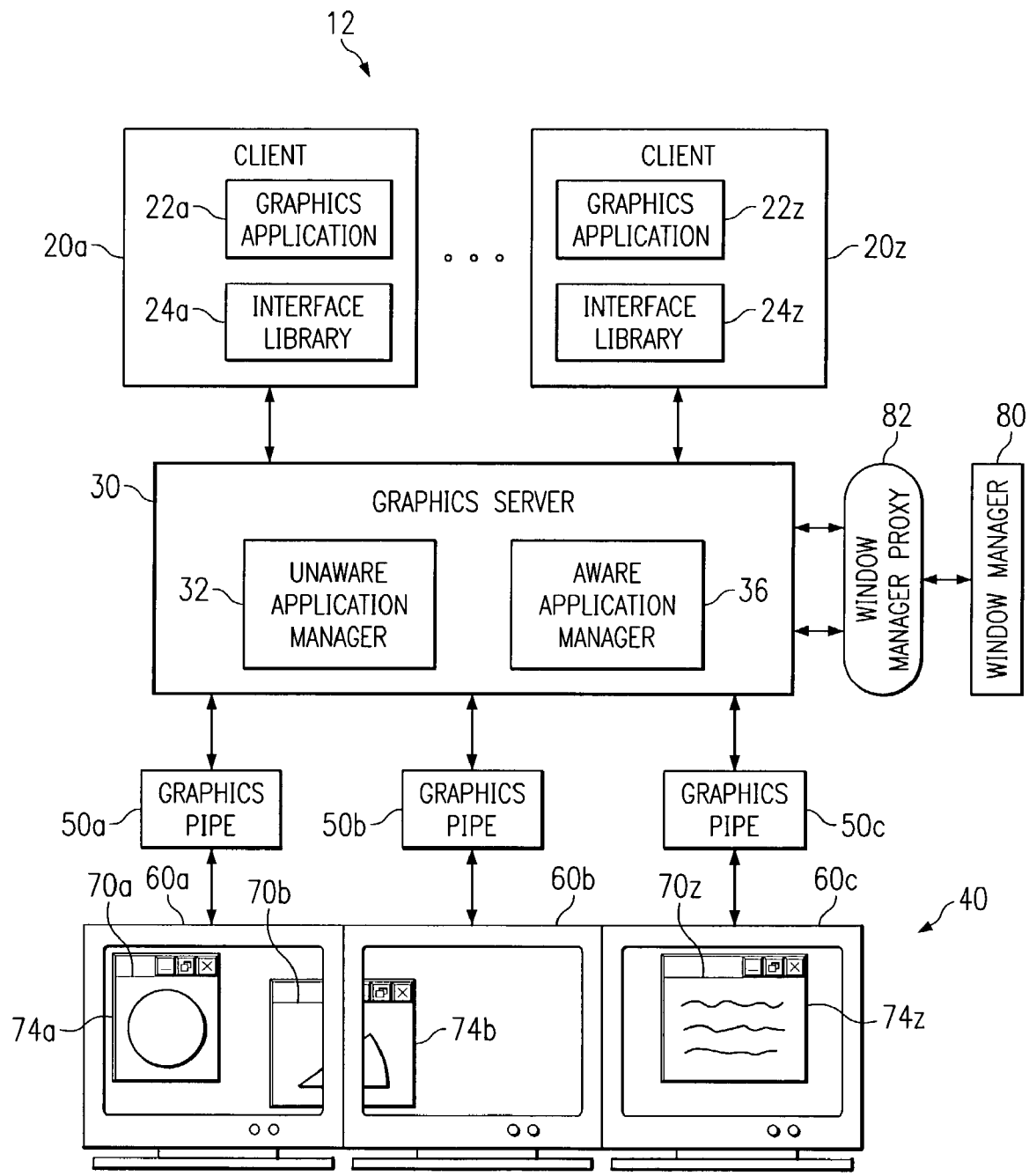
FIG. 2 illustrates another embodiment of a system for managing graphics applications.

FIG. 2 illustrates an embodiment of a system 12 for managing graphics applications. As with system 10, system 12 includes clients 20, graphics server 30, and display system 40, which includes graphics pipes 50 and monitor 60. In this embodiment, however, system 12 also includes a window manager 80, which is responsible for managing windows 70. As can be seen on monitors 60, windows 70 are now bordered by frames 74, which are generated and managed by window manager 80. Frames 74 allow a user to resize and/or move windows 70. For example, frames 74 may provide the commonly known minimize, restore, and/or maximize functions. Additionally, frames 74 may provide a close function for the graphics application.

In operation, graphics applications 22 generate connection request calls, window request calls, and graphics data calls to the associated interface libraries 24, which generate appropriate graphics server requests for graphics server 30. In this embodiment, however, when one of unaware application manager 32 or aware application manager 36 generates a window reply, it also notifies window manager 80 that a window has been created. The window manager 80 may then begin to manage the window, such as for example putting frames around the window and positioning it on monitors 60. Window manager 80 may use the functions in the appropriate application manager to manage the windows. If window manager 80 detects a command to resize one of windows 70, the window manager will resize the associated frame 74 for the window. Graphics server 30 may instruct the client as to the graphics data that should be sent for the modified window 70. Additionally, if window manager 80 detects that one of frames 74 has been grabbed by a user, window manager 80 is responsible for moving the frame and accompanying window 70 on monitors 60. Note that if one of windows 70 has been moved on top of another one of windows 70, window manager 80 is responsible for stacking the windows, and graphics server 30 may instruct the client generating the graphics data for the overlaid window that it no longer needs to generate the graphics data that cannot currently be observed. Window manager 80 may include the Motif Window Manager, the 4Dwm by Silicon Graphics, or any other functions for managing windows.

In the illustrated embodiment, window manager 80 includes a window manager proxy 82. Window manager proxy 82 may actually be part of window manager 80 or may be an interface between graphics server 30 and window manager 80. Window manager proxy 82 is responsible for receiving window-related information from unaware application manager 32 and aware application manager 36 and converting it into an appropriate format for window manager 80. Additionally, window manager proxy 82 is responsible for receiving window management commands from window manager 80 and converting them into an appropriate format for unaware application manager 32 and aware application manager 36. In particular embodiments, window manager proxy 82 knows whether an application is aware or unaware of graphics pipes 50 by the path upon which a request arrives. Thus, window manager proxy 82, in effect, allows window manger 80 to have an aware and an unaware connection to graphics server 30, allowing window manager 80 to concurrently manage windows for unaware and aware graphics applications. In certain embodiments, however, window manager 80 and/or window manager proxy 82 may connect to multiple graphics servers, each having an application manager.

Accordingly, window manager 80 may include a window manager that does not appreciate that some graphics applications do not understand that there are multiple graphics pipes and that some graphics applications do understand that there are multiple graphics pipes or may be a window manager that does have such an appreciation. Furthermore, window manager 80 may itself be unaware of graphics pipes 50 for unaware applications and aware of graphics pipes 50 for aware applications. In general, window manager proxy 82 may allow any type of window manager to be used.

This embodiment of the invention provides concurrent and coherent support for window management for unaware and aware graphics applications. Accordingly, windows management is available for unaware and aware graphics applications operating at the same time, and the management for such applications will be consistent since it is performed by one window manager.

Figure 3:
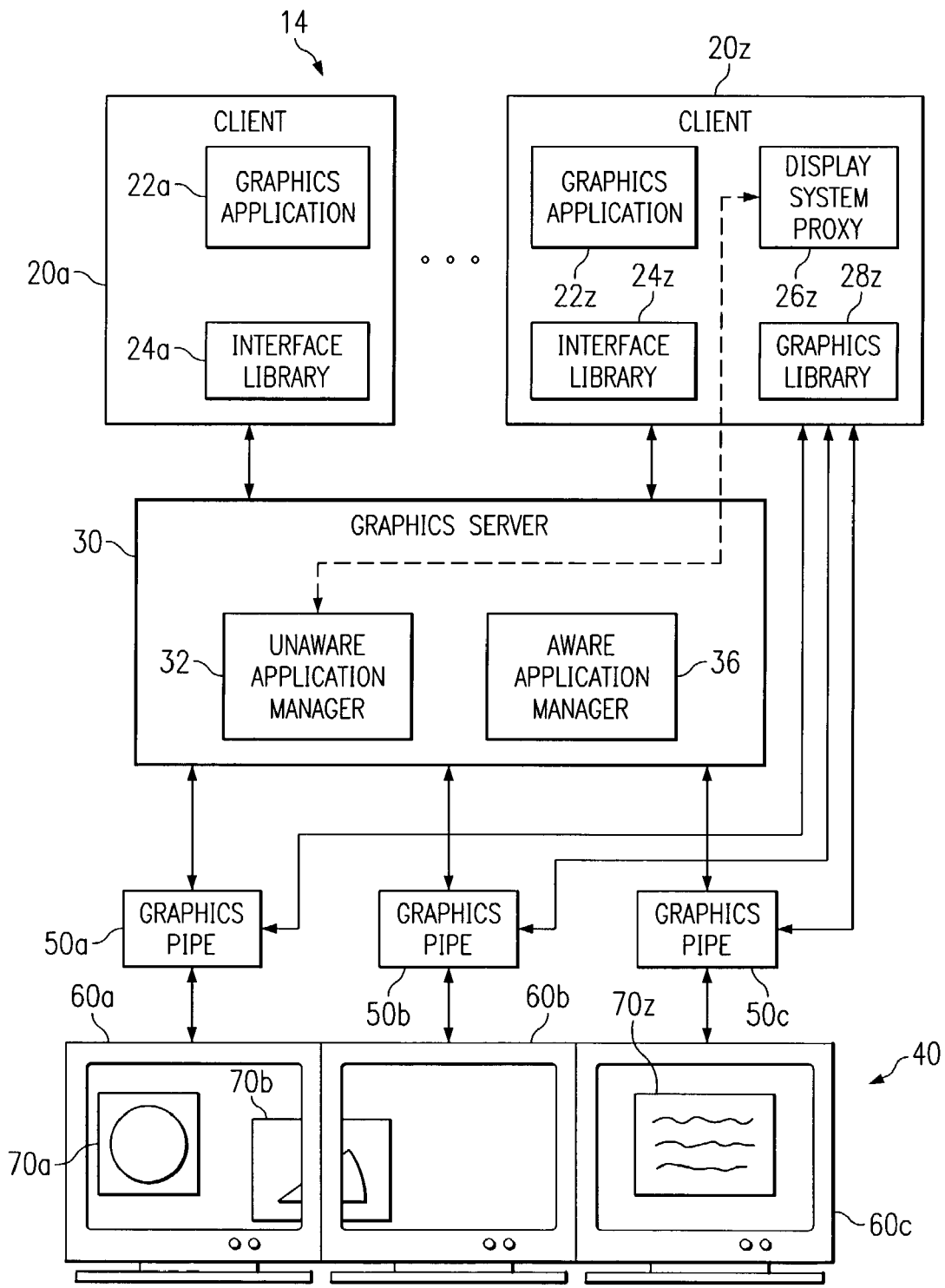
FIG. 3 illustrates yet another embodiment of a system for managing graphics applications.

FIG. 3 illustrates an embodiment of a system 14 for managing graphics applications. As with system 10, system 14 includes clients 20, graphics server 30, and display system 40. In this embodiment, however, client 20z includes a display system proxy 26z and a graphics library 28z. Display system proxy 26z is operable to intercept and convey the graphics data from graphics application 22z to graphics pipes 50, and graphics library 28z is operable to convert the graphics data into an appropriate format for graphics pipes 50. The data is sent to these graphics pipes using render threads, and proxy 26z may create one thread per pipe per context per application. Accordingly, this embodiment illustrates a situation where graphics application 22z is unaware that there are multiple graphics pipes 50.

In operation, graphics applications 22 other than graphics application 22z, generate appropriate connection request calls, window request calls, and graphics data calls to the associated interface libraries 24, which generates appropriate requests for graphics server 30. Also, unaware application manager 32 and aware application manager 36 convey the graphics data from these clients to graphics pipes 50 for display on monitors 60. When graphics application 22z desires to have graphics data displayed, it also generates a connection request and sends it to graphics server 30 through interface library 24z. Graphics server 30 assigns the connection request to unaware application manager 32, which responds with a connection reply that aggregates the characteristics of graphics pipes 50. Then, when graphics application 22z is ready to open a window, the window request is made to graphics server 30 through interface library 24z. Unaware application manager 32 receives this window request and generates a window reply to graphics application 22z. Additionally, unaware application manager 32 notifies display system proxy 26z how graphics data is to be conveyed to graphics pipes 50. In particular embodiments, display system proxy 26z communicates with unaware application manager 32 to get the real visual identifiers and attributes of the real sibling windows the application manager created so that a matching rendering context in each window may be created. When graphics application 22z begins to send graphics data for the open window, the graphics data is intercepted by display system proxy 26z, which divides it between the appropriate ones of graphics pipes 50, and is then sent to graphics library 28z, which converts it into an appropriate format for these graphics pipes.

Note, that graphics pipes 50 are shown as bi-directional because readbacks, such as for example state commands, may be passed back from graphics pipes 50. Proxy 28z may composite all the readbacks into one for the graphics application.

This embodiment of the invention may be particularly useful when graphics application 22z is generating complex graphics data, such as for example 3D graphics, because the graphics data is sent directly to graphics pipes 50 without encountering the overhead of graphics server 30, allowing for faster rendering. If 3D graphics are being used, graphics library 26z may be an OpenGL library, which is operable to handle both OpenGL and GLX calls, or any other appropriate type of 3D graphics library.

In other embodiments, a display system proxy such as display system proxy 26z and a graphics library such as graphics library 28z may be used with one or more of graphics applications 22. Accordingly, some or all of the graphics data may avoid being sent through graphics server 30. Furthermore, a display system proxy may not be used if the graphics application is aware that there are multiple graphics pipes 50. In certain embodiments, display system proxy 26z may be disabled by an environment variable set at runtime. Note that window manager 80 and/or window manager proxy 82 of system 12 may be used to manage windows in this embodiment.

Figure 4:
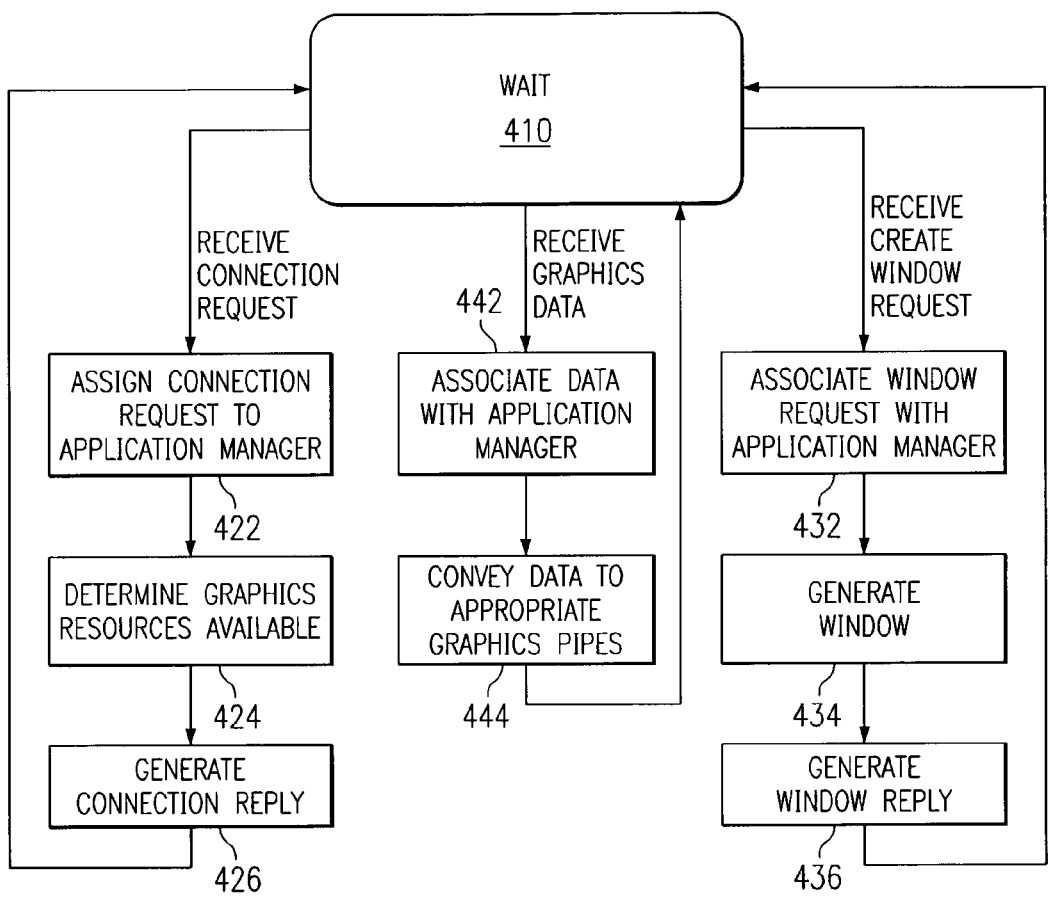
FIG. 4 is a flow diagram illustrating one embodiment of a method for managing graphics applications.

FIG. 4 is a flow diagram 400 illustrating one method for managing graphics applications. Flow diagram 400 begins at wait state 410, where a graphics server, such as for example graphics server 30, waits to receive graphics information from a graphics application. Upon receiving a connection request from a graphics application, the graphics server assigns the connection request to an application manager at function block 422 and determines the graphics resources available at function block 424. The graphics resources available may be determined, for example, by determining the capabilities of graphics pipes 50. At function block 426, the graphics server generates a connection reply for the graphics application. As mentioned previously, the reply may aggregate the characteristics of the graphics pipes or report the characteristics of the graphics pipes individually depending on whether the requesting client is aware or unaware. Once the requesting graphics application receives the connection reply, it may proceed to make other requests through the new connection. The method calls for waiting for more graphics information.

When the graphics server receives a window creation request, it associates the request with the previously assigned application manager at function block 432. The graphics server generates a window for the window request at function block 434 and generates a reply for the window request at function block 436. Once the requesting graphics application has received the window reply, the graphics application may begin to send graphics data for display. The method calls for waiting for more graphics information.

When the graphics server receives graphics data from a graphics application, the graphics server associates the data with an application manager at function block 442 based on the connection upon which the data arrives. At function block 444, the graphics data is conveyed to the appropriate graphics pipes. As discussed previously, the graphics data may be conveyed based on whether the graphics application that sent the graphics data is aware of the multiple graphics pipes or not. Once the data has been conveyed to the appropriate graphics pipes, the method calls for waiting to receive more graphics information.

As can be seen by flow diagram 400, the method allows for a variety of graphics applications to be sending graphics data to be displayed at one time. Accordingly, graphics applications that are aware of the multiple graphics pipes and those that are not so aware may be in use concurrently with their data being displayed on multiple monitors.

Other embodiments may include fewer, more, and/or a different arrangement of operations. For example, in some embodiments, the graphics server may communicate with a window manager that manages the windows. As another example, in certain embodiments, some or all of the graphics data may circumvent the graphics server. As a further example, in certain embodiments, the graphics server may associate a request with an application manager based on the type of resource being manipulated rather than the connection upon which the request arrives.

Figure 5:
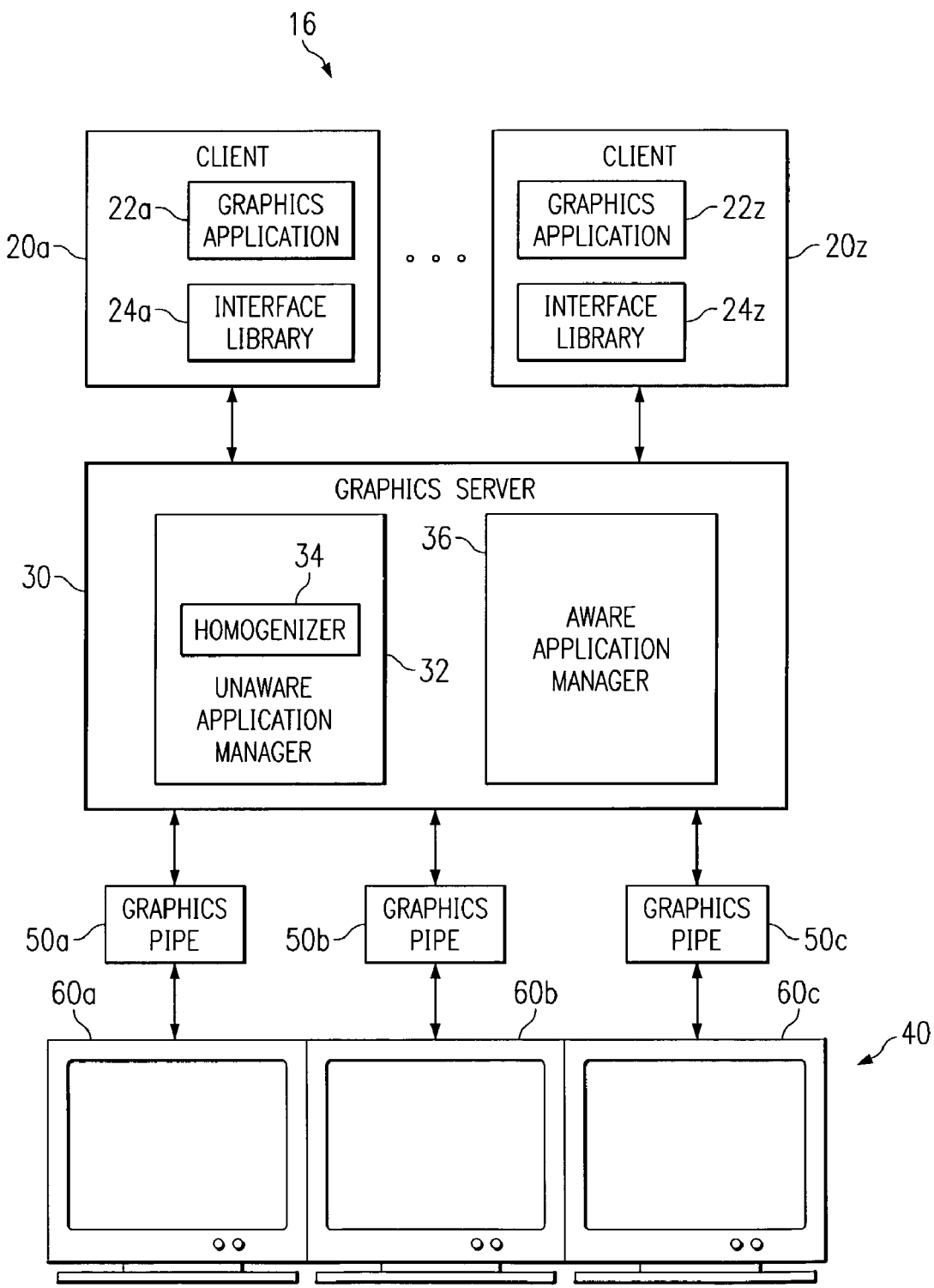
FIG. 5 illustrates an additional embodiment of a system for managing graphics applications.

FIG. 5 illustrates an embodiment of a system 16 for managing graphics applications. As with system 10, system 16 includes clients 20, graphics server 30, and display system 40. In this embodiment, however, unaware application manager 32 includes a homogenizer 34, which, in general, is responsible for generating a common capability set for graphics pipes 50. A capability set contains attributes that specify, at least in part, how graphics data will be displayed. By using homogenizer 34, graphics applications 22 that are not aware that there are multiple graphics pipes 50 may properly create graphics data for display on monitors 60 that have different display capabilities, which expands the usefulness of multiple pipe display systems.

In operation, when one of graphics applications 22 wants to have graphics data displayed, it establishes a connection to graphics server 30. To accomplish this, the graphics application calls the associated interface library 24, which generates the appropriate graphics request for graphics server 30. When the connection request arrives at graphics server 30, graphics server 30 determines whether the connection request is for an aware graphics application or an unaware graphics application.

If for an aware graphics application, the graphics server assigns the connection request to aware application manager 36. Application manager 36 determines capability sets for each of graphics pipes 50 and sends these to the requesting graphics application with the connection reply. To determine the capability sets, application manager 36 may, for example, extract capability sets from graphics pipes 50. Application manager 36 may accomplish this, for example, with appropriate function calls and/or queries to graphics pipes 50. Upon receiving the capability sets, the requesting graphics application 22 may determine how it is going to format graphics data for each of graphics pipes 50. The graphics application may inform graphics server 30 what format it has chosen in the window request.

If, however, the connection request is for an unaware graphics application, graphics server 30 assigns the connection request to unaware application manager 32. Like application manager 36, application manager 32 may determine capability sets for each of graphics pipes 50. However, because the requesting application cannot interact with the graphics pipes individually, or does not want to interact with the graphics pipes individually, homogenizer 34 generates capability sets that are common to each of graphics pipes 50 and sends these to the requesting client with the connection reply. The graphics application of the requesting client may determine which format it will use. Note that a request for the use of only one graphics pipe may be treated similarly to the request from an aware graphics application, except that the capability sets for only one graphics pipe would be in the connection reply.

Homogenizer 34 may be used at the initiation of graphics server 30, at the initiation of one of graphics applications 22, at the initiation of each of graphics applications 22, at the initiation of each context of graphics applications 22, or at any other appropriate time. Note that the common capability sets generated by homogenizer 34 may vary depending on the capability sets already being used on graphics pipes 50.

FIG. 6 illustrates a table 600 of capability sets for graphics pipes 50a–c. As illustrated, table 600 has three columns 610. Column 610a contains the capability sets for graphics pipe 50a, column 610b contains the capability sets for graphics pipe 50b, and column 610c contains the capability sets for graphics pipe 50c. In this illustration, the first attribute in each capability set is the color scheme used, the second attribute is the number of bits used to represent color, and the third attribute is the number of buffers used for rendering graphics objects. Accordingly, for the first capability set in column 610a, "RGB" denotes a red-green-blue color scheme, "8" denotes an eight bit color representation, and "DB" denotes that two buffers are used for rendering graphics to the monitor. Additionally, some capability sets have the ability to perform stereo—denoted by "S"—and some capability sets have the ability to use auxiliary buffers—denoted by "AB".

As can be seen in table 600, graphics pipes may have a wide range of attributes and combinations thereof. Table 600, however, only illustrates one embodiment of capability sets, and any other appropriate capability sets may be used with the present invention.

In particular embodiments, homogenizer 34 generates the common capability sets by determining which capability sets of one of graphics pipes 50 have corresponding capability sets on each of the other graphics pipes 50. Capability sets may correspond if at least one of their attributes are similar. Additionally, capability sets may not correspond if one does not contain a mandatory attribute, which may have been specified by the requesting client 20, graphics server 30, and/or a component of display system 40.

In certain embodiments, a weighting may be assigned to the attributes so that certain ones are more highly favored in determining if capability sets correspond. The relative weighting of the attributes may be specified by the requesting client 20, graphics server 30, and/or display system 40. Additionally, in particular embodiments, at least one attribute, such as for example the color scheme and/or the number of bits used to represent color, may have to match for two capability sets to correspond. These mandatory matches may also be specified by the requesting client 20, graphics server 30, and/or display system 40.

As an example, suppose that a graphics application was particularly interested in displaying graphics in stereo. Analyzing the capability sets in table 600 would lead to finding a correspondence between the first capability set in column 610a, the first capability set in column 610b, and the first capability set in column 610c, assuming color scheme and color bits received some consideration. On the other hand, if the graphics application was particularly interested in displaying graphics using two rendering buffers, a correspondence would be found, again assuming some consideration of color scheme and color bits, between: 1) the first capability set in column 610a, the second capability set in column 610b, and the first capability set in column 610c; and 2) the second capability set in column 610a, the third capability set in column 610b, and the second capability set in column 610c. As a further example, suppose that a graphics application was particularly interested in having its colors represented by twelve bits. A correspondence would be found between the third capability set in column 610a, the fourth capability set in column 610b, and the third capability set in column 610c.

Note that it may be possible for a capability set on one graphics pipe to have more than one corresponding capability set on other graphics pipes. Accordingly, the attribute weighting scheme may be used to determine the capability sets that have the highest degree of correspondence. In certain embodiments, however, capability sets that have more than one corresponding capability set on other graphics pipes may be allowed to have more than one corresponding capability set on each pipe. This may provide more options in determining the common capability sets.

After determining which capability sets have corresponding capability sets on each of graphics pipes 50, homogenizer 34 determines whether attributes that do not match between the corresponding capability sets have common characteristics. If the attributes that do not have a match between corresponding capability sets do have common characteristics, homogenizer 34 may use the common characteristics in the common capability set instead of the respective attributes.

For example, consider the first example discussed above. Determining correspondence with a heavy weight toward stereo capabilities produced three corresponding capability sets that used the RGB color scheme, eight bits to represent color, and stereo capabilities. However, the corresponding capability set in column 610a has double rendering buffers and auxiliary buffers, the corresponding capability set in column 610b has a single rendering buffer, and the corresponding capability set in column 610c has double rendering buffers and auxiliary buffers. Accordingly, there is no match between the rendering buffers and the auxiliary buffers of these capability sets. It should, however, be possible to use a single rendering buffer instead of double rendering buffers. Thus, the common capability set sent to the requesting client for these corresponding capability sets may specify that a single rendering buffer is available. Note, however, that there is no common characteristic between the auxiliary buffering attributes of these capability sets. Thus, there is no substitute for this attribute.

In general, there are a variety of attributes that have common characteristics. For example, RGB is a characteristic of RGBA and, accordingly, may be substituted for it. As another example, using eight bits to represent color is a characteristic of using sixteen bits and, accordingly, may be substituted for it. Of course, a substitution for an attribute may not be made if a component requires that attribute.

After determining whether any attributes that do not match between corresponding sets have common characteristics, homogenizer 34 determines whether the other attributes that do not match between the corresponding capability sets may not be used. This may rely upon preferences from the requesting client 20, graphics server 30, and/or the capabilities of graphics pipes 50. If these non-matching attributes may be removed, a common capability set should be achievable.

For instance, continuing with the previous example, after the double rendering buffering has been reduced to single rendering buffering, the first capability set in column 610a and the first capability set in column 610c still have auxiliary buffering capability while the first capability set in column 610b does not. If no component has specified that auxiliary buffers are mandatory, the auxiliary buffer attribute may not be used in the common capability set. Accordingly, the capability set sent to the requesting graphics application could specify an RGB color scheme using eight bits with a single rendering buffer.

As another illustration, for the case where double rendering buffers are a preferred option, the common capability set generated from the first capability set of column 610a, the second capability set of column 610b, and the first capability set of column 610c may not include the stereo capability of the first capability set of column 610a and the first capability set of column 610c to accommodate the second capability set of column 610b, as long as stereo was not a mandatory option. Furthermore, the common capability set generated from the second capability set of column 610a, the third capability set of column 610b, and the third capability set of column 610c may not include the stereo capability of the second capability set of column 610a, the auxiliary buffer capability of the third capability set of column 610b, and the stereo capability and the auxiliary buffer capability of the third capability set of column 610c, as long as stereo capability and auxiliary buffer capability were not required by a component.

After this, the common capability sets may be sent to the requesting application. If more than one common capability set is sent to the requesting application, as mentioned previously, the requesting application may choose which capability set to use.

Although system 16 illustrates one embodiment of the present invention, other embodiments may include less, more, and/or a different arrangement of components. For example, although illustrated as part of unaware application manager 32 in system 16, homogenizer 34 could be located anywhere in graphics server 30. Moreover, graphics server 30 may be configured differently too, such as for example having unaware application manager 32 be a part of aware application manager 36. Additionally, in certain embodiments, homogenizer 34 could be separate from graphics server 30. Note that homogenizer 34 may also be used with system 12 or system 14. Furthermore, homogenizer 34 may be part of a graphics server that does not manage the conveyance of graphics data from aware graphics applications, a graphics server that does manage the conveyance of graphics data from one graphics application, or otherwise associated with logic that manages the conveyance of graphics data. A variety of other examples exist.

A variety of attribute weightings may be used in determining if capability sets correspond. In certain embodiments, matching the number of bits used to represent color receives the highest priority, followed by matching the scheme used to represent color, the use of double rendering buffers, stereo capability, and auxiliary buffers, respectively. Other embodiments, of course, may use less, more, and/or a different arrangement of weightings. For example, in some embodiments, matching the color scheme may be weighted highest, especially where color schemes besides RGB and RGBA are used. As another example, in some embodiments matching the double buffering capability and stereo capabilities may not be used. As a further example, in embodiments where other attributes are present, they may receive weightings in order that they may be used in determining correspondence.

In particular embodiments, determining the correspondence between capability sets occurs in iterations. For example, during the first iteration, an algorithm performs a rough matching based on the following attributes: GLX_RED_SIZE, GLX_GREEN_SIZE, GLX_BLUE_SIZE, GLX_ALPHA_SIZE. Moreover, any other attributes based on number of bits or buffer size may be considered at this time. In the next iteration, based on a pre-specified weighting, these lists may be further culled and put together based on a lowest common denominator approach.

For example, if graphics pipe 0 has the following capability sets:
1. RGBA8, DoubleBuffer, Stereo, and
2. RGB12, SingleBuffer, No Stereo, and graphics pipe 1 has the following capability sets:
1. RGB8, DoubleBuffer No Stereo, and
2. RGB8, SingleBuffer, Stereo, then after the iteration for color bits, graphics pipe 0 will have:
1. RGBA8, DoubleBuffer, Stereo, and graphics pipe 1 will have:
1. RGB8, DoubleBuffer, No Stereo, and
2. RGB8, SingleBuffer, Stereo.

Then, if the configurable weighting specifies that double buffering has a higher weighting than stereo, after the next iteration, the final homogeneous capability set exported is:
1. RGB8, DoubleBuffer, No Stereo.

However, if the configurable weighting specifies that stereo has a higher weighting, after the next iteration, the final homogenous capability set exported is:

1. RGB8, SingleBuffer, Stereo.

Table 1 presents another example of attributes and their weighting in accordance with the present invention.

TABLE 1

Attribute Weighting

| Attribute | Description |
|---|---|
| GLX_RGBA | If present, only TrueColor and DirectColor visuals are considered. Otherwise, only PseudoColor and StaticColor visuals are considered. |
| GLX_RED_SIZE | Must be followed by a nonnegative minimum size specification. If this value is zero, the smallest available red buffer is preferred. Otherwise, the largest available red buffer of at least the minimum size is preferred. |
| GLX_GREEN_SIZE | Must be followed by a nonnegative minimum size specification. If this value is zero, the smallest available green buffer is preferred. Otherwise, the largest available green buffer of at least the minimum size is preferred. |
| GLX_BLUE_SIZE | Must be followed by a nonnegative minimum size specification. If this value is zero, the smallest available blue buffer is preferred. Otherwise, the largest available blue buffer of at least the minimum size is preferred. |
| GLX_ALPHA_SIZE | Must be followed by a nonnegative minimum size specification. If this value is zero, the smallest available alpha buffer is preferred. Otherwise, the largest available alpha buffer of at least the minimum size is preferred. |
| GLX_DOUBLEBUFFER | If present, only double-buffered visuals are considered. Otherwise, only single-buffered visuals are considered. |
| GLX_STEREO | If present, only stereo visuals are considered. Otherwise, only monoscopic visuals are considered. |
| GLX_AUX_BUFFERS | Must be followed by a nonnegative integer that indicates the desired number of auxiliary buffers. Visuals with the smallest number of auxiliary buffers that meets or exceeds the specified number are preferred. |
| GLX_DEPTH_SIZE | Must be followed by a nonnegative minimum size specification. If this value is zero, visuals with no depth buffer are preferred. Otherwise, the largest available depth buffer of at least the minimum size is preferred. |
| GLX_STENCIL_SIZE | Must be followed by a nonnegative integer that indicates the desired number of stencil bitplanes. The smallest stencil buffer of at least the specified size is preferred. If the desired value is zero, visuals with no stencil buffer are preferred. |
| GLX_ACCUM_RED_SIZE | Must be followed by a nonnegative minimum size specification. If this value is zero, visuals with no red accumulation buffer are preferred. Otherwise, the largest possible red accumulation buffer of at least the minimum size is preferred. |
| GLX_ACCUM_GREEN_SIZE | Must be followed by a nonnegative minimum size specification. If this value is zero, visuals with no green accumulation buffer are preferred. Otherwise, the largest possible green accumulation buffer of at least the minimum size is preferred. |
| GLX_ACCUM_BLUE_SIZE | Must be followed by a nonnegative minimum size specification. If this value is zero, visuals with no blue accumulation buffer are preferred. Otherwise, the largest possible blue accumulation buffer of at least the minimum size is preferred. |
| GLX_ACCUM_ALPHA_SIZE | Must be followed by a nonnegative minimum size specification. If this value is zero, visuals with no alpha accumulation buffer are preferred. Otherwise, the largest possible alpha accumulation buffer of at least the minimum size is preferred. |
| GLX_SAMPLE_BUFFERS_SGIS | Must be followed by the minimum acceptable number of multisample buffers. Visuals with the smallest number of multisample buffers that meet or exceed this minimum number are preferred. Currently operation with more than one multisample buffer is undefined, so the returned value will be either zero or one. Note that multisampling is support only on RealityEngine. |
| GLX_SAMPLES_SGIS | Must be followed by the minimum number of samples required in multisample buffers. Visuals with the smallest number of samples that meet or exceed the specified minimum number are preferred. Note that it is possible for color samples in the multisample buffer to have fewer bits than colors in the main color buffers. However, multisampled colors maintain at least as much color resolution in aggregate as the main color buffers. |
| GLX_TRANSPARENT_TYPE_EXT | Must be followed by one of GLX_NONE_EXT, GLX_TRANSPARENT_RGB_EXT, GLX_TRANSPARENT_INDEX_EXT. If GLX_NONE_EXT is specified, then only opaque visuals will be considered; if GLX_TRANSPARENT_RGB_EXT is specified, then only transparent, RGBA visuals will be considered; if GLX_TRANSPARENT_INDEX_EXT is specified, then only transparent, indexed visuals will be considered. If not specified, the value GLX_NONE_EXT is used. |
| GLX_TRANSPARENT_INDEX_VALUE_EXT | Must be followed by an integer value indicating the transparent index value; the value must be between 0 and the maximum framebuffer value for indices. Only visuals that use the specified transparent index value will be considered. This attribute is ignored during visual selection unless it is explicitly specified and GLX_TRANSPARENT_TYPE_EXT is specified as GLX_TRANSPARENT_INDEX_EXT. |
| GLX_TRANSPARENT_RED_VALUE_EXT | Must be followed by an integer value indicating the transparent red value; the value must be between 0 and the maximum framebuffer value for red. Only visuals that use the specified transparent red value will be considered. This attribute is ignored during visual selection unless it is explicitly specified and GLX_TRANSPARENT_TYPE_EXT is specified as GLX_TRANSPARENT_RGB_EXT. |
| GLX_TRANSPARENT_ | Must be followed by an integer value indicating the transparent green value; |

TABLE 1-continued

Attribute Weighting

| Attribute | Description |
|---|---|
| GREEN_VALUE_ EXT | the value must be between 0 and the maximum framebuffer value for green. Only visuals that use the specified transparent green value will be considered. This attribute is ignored during visual selection unless it is explicitly specified and GLX_ TRANSPARENT_TYPE_EXT is specified as GLX_TRANSPARENT_ RGB_EXT. |
| GLX_ TRANSPARENT_ BLUE_VALUE_ EXT | Must be followed by an integer value indicating the transparent blue value; the value must be between 0 and the maximum framebuffer value for blue. Only visuals that use the specified transparent blue value will be considered. This attribute is ignored during visual selection unless it is explicitly specified and GLX_TRANS-PARENT_TYPE_EXT is specified as GLX_TRANSPARENT_RGB_EXT. |
| GLX_ TRANSPARENT_ ALPHA_VALUE_ EXT | Must be followed by an integer value. This attribute is always ignored; it is for future use only. |
| GLX_VISUAL_ CAVEAT_EXT | Must be followed by one of GLX_NONE_EXT, GLX_SLOW_VISUAL_EXT, GLX_NON_CONFORMANT_ EXT. If GLX_NONE_EXT is specified, then only visuals with no caveats will be considered; if GLX_SLOW_VISUAL_EXT, is specified then only slow visuals will be considered; if GLX_NON_ CONFORMANT_EXT is specified then only non-conformant visuals will be considered. This attribute is ignored during visual selection unless it is explicitly specified. |
| GLX_X_ VISUAL_TYPE_ EXT | Must be followed by one of GLX_TRUE_ COLOR_EXT, GLX_ DIRECT_COLOR_EXT, GLX_ PSEUDO_COLOR_EXT, GLX_STATIC_COLOR_EXT, GLX_GRAY_SCALE_EXT, GLX_STATIC_GRAY_EXT, indicating the desired X visual type. If GLX_RGBA is in attribList, then only GLX_TRUE_COLOR_EXT and GLX_DIRECT_COLOR_ EXT can produce a match. If GLX_X_ VISUAL_TYPE_EXT is not in attribList, and if all other attributes are equivalent, then a TrueColor visual will be chosen in preference to a DirectColor visual. If GLX_RGBA is not in attribList, then only GLX_PSEUDO_COLOR_EXT and GLX_STATIC_ COLOR_EXT can produce a match. If GLX_ X_VISUAL_TYPE_EXT is not in attribList, and if all other attributes are equivalent, then a PseudoColor visual will be chosen in preference to a StaticColor visual. |

Figure 7:
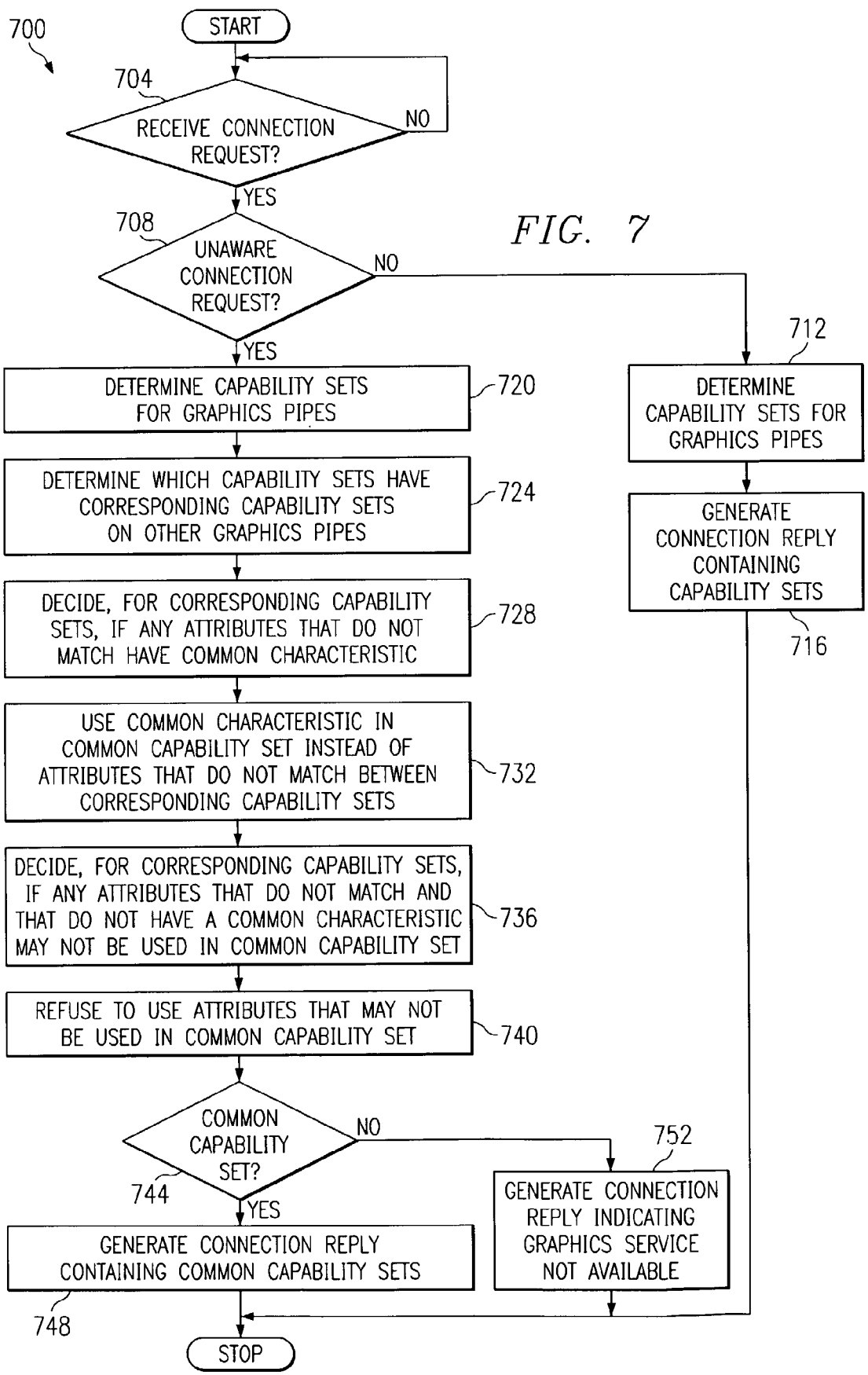
FIG. 7 is a flow diagram illustrating another embodiment of a method for managing graphics applications.

FIG. 7 is a flow diagram 700 illustrating one embodiment of a method for managing graphics applications. The method begins at decision block 704 with waiting to receive a connection request. At decision block 708, the method calls for determining whether the connection request is for an unaware client.

If the connection request is not for an unaware client, the method calls for determining capability sets for graphics pipes at function block 712. As discussed previously, this may include extracting capability sets from graphics pipes such as graphics pipes 50. At function block 716, the method calls for generating a connection reply containing the capability sets for the graphics pipes. The method is then at an end. The requesting client will be responsible for determining which capability sets it wants to use. The requesting graphics application may communicate this selection in a window request.

If, however, the connection request is for an unaware client, the method calls for determining capability sets for graphics pipes at function block 720. At function block 724, the method calls for determining which capability sets have corresponding capability sets on the other graphics pipes. As discussed previously, this may involve analyzing which attributes are required and/or which ones are preferred. For the corresponding capability sets, the method calls for deciding if any attributes that do not have a match between them have a common characteristic at function block 728. At function block 732, if any of the attributes that do not have a match between the corresponding capability sets have a common characteristic, the method provides for using the characteristic in the common capability set instead of the attributes. Note that using a characteristic in a common capability set instead of attributes may include substituting the characteristic for the attributes in the common capability set and/or in the corresponding capability sets, inserting the characteristic in the common capability set instead of the attributes, or otherwise using the characteristic in place of the attributes in the common capability set.

At function block 736, the method calls for deciding if any attributes that do not match between corresponding capability sets and that do not have a common characteristic may not be used in the common capability set. As mentioned previously, this may be accomplished if no component has designated one of these attributes as mandatory. At function block 740, attributes that may not be used are not used in the common capability set. Note that not using the attributes in the common capability set may encompass deleting them from the common capability set and/or the corresponding capability sets, not inserting them in the common capability set, or otherwise not using them in the common capability set.

At function block 744, the method calls for determining if there is at least one common capability set. A common capability set may not exist, for example, if there is no correspondence between capability sets on each graphics pipe 50, if corresponding capability sets have attributes that do not match and that may not be deleted, or for any other appropriate reason. If there is at least one common capability set, the method calls for generating a connection reply containing the common capability sets at function block 748. The method is then at an end. As mentioned previously, if there is more than one common capability set, the requesting graphics application may determine which common capability set it desires to use. If, however, there is no common capability set, a connection reply is generated indicating that graphics service is not available at function block 752. The method is then at an end. The requesting graphics application may determine whether it wants to alter any requested attributes and submit a new connection request.

The method illustrated by flow diagram 700 may be useful with any of the previously described embodiments of the present invention. For example, the method could readily be incorporated into function block 424 of flow diagram 400.

While flow diagram 700 illustrates one embodiment of a method for managing graphics applications, other embodiments may contain less, more, and/or a different arrangement of operations. For example, in some embodiments, the method may call for removing attributes that do not have a match between corresponding capability sets and that may be removed before attempting to determine if attributes that do not match have a common characteristic. As another example, in particular embodiments, the capability sets for the graphics pipes may be maintained once they are determined the first time and, thus, when subsequent connection requests are received, the capability sets do not have to be determined again. Moreover, the capability sets may be determined before a connection request is received. As a further example, in certain embodiments, instructions may be generated for the graphics pipes as to the capability set to be used. As an additional example, in some embodiments, the failure to find a common capability set may be a fatal error and/or cause the server to reset. As a further example, in certain embodiments, if more than one common capability set exists, a downselecting between the common capability sets may be performed for the requesting client. This may be accomplished, for example, by determining which common capability set is closest to the actual capability sets. As an additional example, in particular embodiments, the operations regarding aware graphics applications may not exist, especially if there are no aware graphics applications being used. A variety of other examples exist.

What is claimed is:

1. A system for managing graphics applications, comprising:
a first application manager in a graphics server operable to manage the conveyance of graphics data from an aware graphics application to a plurality of graphics pipes, the aware graphics application having information as to a number of graphics pipes; and
a second application manager in the graphics server operable to manage the conveyance of graphics data from an unaware graphics application to a plurality of graphics pipes, the unaware graphics application having no information as to the number of graphics pipes;
wherein the first application manager and the second application manager may operate concurrently with coherent window management support for aware and unaware graphics applications.

2. The system of claim 1, wherein the graphics data comprises graphics primitives.

3. The system of claim 1, wherein:
the first application manager is operable to receive graphics data from the aware graphics application and to convey the data to appropriate graphics pipes to manage the conveyance of graphics data; and
the second application manager is operable to receive graphics data from the unaware graphics application and to convey the data to appropriate graphics pipes to manage the conveyance of graphics data.

4. The system of claim 3, wherein:
the first application manager is operable to distribute graphics data to appropriate graphics pipes to convey the data to appropriate graphics pipes; and
the second application manager is operable to divide graphics data between appropriate graphics pipes to convey the data to appropriate graphics pipes.

5. The system of claim 1, wherein:
the first application manager is operable to send graphics calls destined for the second application manager to the second application manager; and
the second application manager is operable to send graphics calls destined for the first application manager to the first application manager.

6. The system of claim 1, wherein the second application manager is further operable to receive a connection request from the unaware graphics application and generate a reply that aggregates the characteristics of graphics pipes.

7. The system of claim 1, further comprising a window manager operable to receive window management notifications from at least the first application manager and the second application manager and to coherently manage windows conveying the graphics data.

8. The system of claim 7, further comprising a window manager proxy operable to receive window management notifications from at least the first application manager and the second application manager and to convert the notifications into a format appropriate for the window manager.

9. The system of claim 1, further comprising a window manager proxy operable to receive window management notifications from at least the first application manager and the second application manager and to convert the notifications into a format appropriate for a window manager.

10. The system of claim 1, further comprising a graphics library operable to receive graphics application data and convert it into a graphics pipe format.

11. The system of claim 10, further comprising a display system proxy operable to receive graphics data from a graphics application, prepare it for conveyance to appropriate pipes, and send it to the graphics library.

12. The system of claim 1, wherein the first application manager and the second application manager are part of a graphics server.

13. A method for managing graphics applications, comprising:
managing the conveyance of graphics data from an aware graphics application in a graphics server to a plurality of graphics pipes, the aware graphics application having information as to a number of graphics pipes;
managing the conveyance of graphics data from an unaware graphics application in the graphics server to a plurality of graphics pipes, the unaware graphics application having no information as to the number of graphics pipes; and
coherently managing windows conveying the graphics data for aware and unaware applications.

14. The method of claim 13, wherein:
managing the conveyance of graphics data from the aware graphics application to a plurality of graphics pipes comprises receiving graphics data from the aware graphics application and conveying the data to appropriate graphics pipes; and
managing the conveyance of graphics data from the unaware graphics application to a plurality of graphics pipes comprises receiving graphics data from the unaware graphics application and conveying the data to appropriate graphics pipes.

15. The method of claim 14, wherein:
conveying the data from the aware graphics application comprises distributing the graphics data to appropriate graphics pipes; and
conveying the data from the unaware graphics application comprises dividing the graphics data between appropriate graphics pipes.

16. The method of claim 13, wherein:

managing the conveyance of graphics data from the aware graphics application to a plurality of graphics pipes comprises assigning a graphics call from the aware graphics application to an unaware application manager; and managing the conveyance of graphics data from the unaware graphics application to a plurality of graphics pipes comprises assigning a graphics call from the unaware graphics application to an aware application manager.

17. The method of claim 13, further comprising:

receiving a connection request from the unaware graphics application; and generating a reply that aggregates the characteristics of graphics pipes.

18. The method of claim 13, further comprising:

receiving window management notifications for aware and unaware graphics applications at a window manager proxy; and converting the notifications into a format appropriate for a window manager.

19. A system for managing graphics applications, comprising:

a plurality of graphics pipes;

a graphics server comprising:

a first application manager operable to manage the conveyance of graphics data from an aware graphics application to the graphics pipes, the aware graphics application having information as to a number of graphics pipes, the manager comprising a first dispatch table operable to manage graphics calls from an aware graphics application as part of this management, the calls comprising:

graphics data for the graphics pipes, wherein the manager distributes the data to the appropriate graphics pipes, and connection requests, wherein the manager determines and coveys the characteristics of each of the graphics pipes;

a second application manager operable to manage the conveyance of graphics data from an unaware graphics application to the graphics pipes, the unaware graphics application having no information as to the number of graphics pipes, the manager comprising a second dispatch table operable to manage graphics calls from an unaware graphics application as part of this management, the second dispatch table accessing the first dispatch table for each graphics pipe, the calls comprising:

graphics data for the graphics pipes, wherein the manager divides the data between the appropriate graphics pipes, and connection requests, wherein the manager determines and aggregates the characteristics of the graphics pipes;

a window manager proxy operable to receive window management notifications from at least the aware application manager and the unaware application manager and convert the notifications into a format appropriate for a window manager;

a graphics library operable to receive graphics data and convert it into a graphics pipe format; and a display system proxy operable to receive graphics data from a graphics application, divide it between graphics pipes, and send it to the graphics library;

wherein the first application manager and the second application manager may operate concurrently with coherent window management support for aware and unaware graphics applications.

* * * * *